Figure 1:
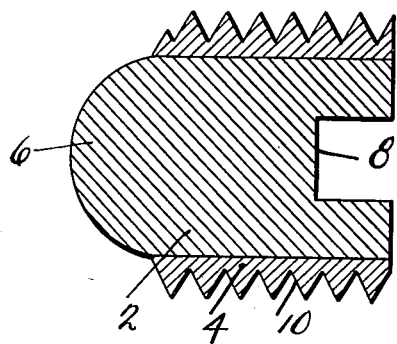

May 22, 1956      H. ULANET      2,747,058

CONTACT ADJUSTMENT SCREWS AND CONTACT ASSEMBLIES

Filed Aug. 27, 1952

INVENTOR
HERMAN ULANET
BY
*James G. Bethell*
ATTORNEY

United States Patent Office 2,747,058
Patented May 22, 1956

---

2,747,058

CONTACT ADJUSTMENT SCREWS AND CONTACT ASSEMBLIES

Herman Ulanet, Maplewood, N. J.

Application August 27, 1952, Serial No. 306,603

5 Claims. (Cl. 200—166)

My invention relates to contact adjustment screws and contact assemblies.

In the electrical controls industry the conventional practice is to employ contact adjustment screws which are tipped with precious metal. The construction commonly employed embodies rivets or discs of precious metal, brazed, staked or welded to the end of the screw. In the controls used for electrical appliances, as well as other low-priced electrical products, the contact material usually employed is silver. However, it is quite obvious that the labor costs involved in spot welding, brazing or staking a silver disc or rivet to the end of a contact adjustment screw are very high, as compared with the cost of the materials involved, making for a very costly article.

The suggestion has been made to fabricate the entire screw from fine silver. This suggestion has not met with favor, however, for several reasons. Silver, being a soft metal, tends to swell after passing through a threading operation, so that it is impossible to maintain a consistent thread dimensional tolerance. Then again, the threads of a silver screw, being soft, are easily fouled during stocking, handling, and upon insertion into threaded holes, particularly where, as is very often the case, snug thread fits are required. In addition to these inherent objectionable characteristics, the solid silver screw is unsatisfactory owing to the tendency for the screw driver slot to spread and foul when driver torque is applied.

In contact assemblies difficulty is experienced in satisfactorily attaching the metal contact to the thin spring metal arm. Attempts have been made to weld or braze the precious metal contact to the arm, but this construction has not proven satisfactory owing to the difficulty in obtaining a bond between the precious metal and the contact arm which will not be ruptured under repeated operaitons. Attempts have been made to rivet the solid precious metal contact to the arm, but, owing to the softness of the metal, it has been found difficult satisfactorily to rivet the contact so that it will not loosen in use, permitting the parts to oxidize, causing overheating and even total destruction.

The present invention has for an object to overcome the difficulties above referred to.

In general, my invention provides a construction embodying a rod composed of a core of precious metal, to which a shell of base metal is continuously bonded. For a contact adjustment screw, the base metal shell, which may be bronze, brass, steel, or other relatively hard metal, is externally threaded. For a contact assembly, the base metal shell is terminated at each end short of the ends of the soft metal core, and one end of the core is inserted through the spring arm of the assembly and upset to rivet the core to the arm.

Figure 2:
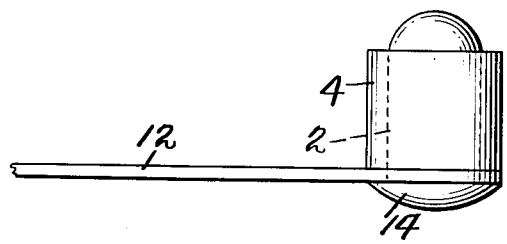

In the accompanying drawings,

Fig. 1 is a longitudinal sectional elevational view of a contact adjustment screw embodying my invention, the screw being shown on a very much enlarged scale for clarity of illustration; and Fig. 2 is an elevational view, also on an enlarged scale, of a contact assembly embodying my invention.

Referring to the drawings in detail, 2 designates a precious metal core, such as silver, for example, to which is continuously bonded a base metal shell 4. The shell may be bronze, brass, steel, or other relatively hard base metal. In making up this assembly, a heavy silver rod, which, if desired, may be coated with silver solder, for example, is inserted into a close fitting base metal sleeve and the assembly passed through a suitable welding furnace, to bond the two elements together continuously. This composite rod is then drawn down to the required diameter.

In machining the contact adjustment screws of Fig. 1 from this stock, the base metal shell 4 is terminated short of the end 6 of the core 2, the shell and core at the other end being flush with each other, and the core at this end provided with screwdriver slot 8.

The shell 4 is exteriorly threaded, as shown at 10, the core 2 being slightly smaller in diameter than the root diameter of the shell threads.

It will be seen from the foregoing that the relatively soft precious metal core 2 is continuously and permanently bonded to the relatively hard base metal shell 4. This provides a much lower contact resistance between the core and the base metal shell than in conventional structures, where a disc or a rivet is brazed or welded to the tip of a base metal screw. It will be quite apparent too that the bonded area in my construction is many times greater than the prior construction just referred to, which promotes retention of the bond under the most trying operating conditions. Another advantage accruing to this large bonded area is the ease with which the heat generated by an arc, when the device is in use and an electric circuit is opened, is dissipated through the shell 4.

It will be appreciated that, by terminating the shell flush with the slotted end of the core 2, the screwdriver slot 8 is well and adequately protected against spreading and fouling.

When making up the contact assembly, as illustrated in Fig. 2, it is unnecessary to thread the base metal shell 4. Instead, I terminate both ends of the shell short of the ends of the core 2, and one projecting end of the core is passed through the spring metal contact arm 12 and upset or headed, as seen at 14. By reason of the fact that the core 2 and shell 4 are continuously bonded to each other, and by reason of the fact that the core projects beyond the shell and is headed over, the contact arm is clamped between the headed-over core and the relatively hard base metal shell, so that the core and shell assembly can be permanently and rigidly secured indefinitely to the contact arm and will successfully withstand the severest and most trying operating conditions.

It is to be understood that changes may be made in the details of construction and arrangement of parts above described within the purview of my invention.

What I claim is:

1. The method of manufacturing a contact assembly, which method comprises inserting a precious metal rod, coated with a precious metal solder, into a close-fitting base metal sleeve; passing this assembly through a furnace to braze the core and shell to each other throughout; drawing down the composite rod thus formed to the required diameter; then machining to terminate the shell short of each end of the precious metal core, inserting one exposed end of the core through a contact arm and upsetting the core end to effect a rigid clamping of the contact arm between one end of the base metal shell and the upset end of the precious metal core.

2. A contact assembly comprising, in combination, a contact machined from a drawn, solid, composite rod, which is composed of a precious metal core and a surrounding base metal shell, continuously bonded to each other throughout with a precious metal, both ends of said core projecting beyond the ends of the shell; and a contact arm, one projecting end of the core projecting through the contact arm where it is upset, rigidly to clamp the arm between the end of the base metal shell at one face of the arm and the upset end of the core at the other face of the arm.

3. The method of manufacturing a contact adjustment screw, which method comprises inserting a precious metal rod, coated with a precious metal solder, into a close-fitting base metal sleeve; passing this assembly through a furnace to braze the core and shell to each other throughout; drawing down the composite rod thus formed to the required diameter; and then machining to terminate the shell short of the core, whose contact surface is concentric with the shell, at one end of the assembly and to finish the opposite end so that core and shell are flush with each other, threading the shell exteriorly and forming a screwdriver slot in the end of the core that is flush with the shell end.

4. As an article of manufacture, a contact adjustment screw machined from a drawn, solid, composite rod, which is composed of a precious metal core and a surrounding, externally threaded base metal shell continuously bonded to each other throughout with a precious metal, the contact surface of said core being concentric with the shell, said shell at one end terminating short of the corresponding end of the core, and means for turning said screw.

5. As an article of manufacture, a contact adjustment screw machined from a drawn, solid, composite rod, composed of a precious metal core and a surrounding, externally threaded base metal shell continuously bonded to each other throughout with a precious metal, the said shell at one end terminating short of the corresponding end of the core whose contact surface is concentric with the shell, the opposite end of the core being provided with a drive slot, this end of the core and shell being flush with each other.

References Cited in the file of this patent

UNITED STATES PATENTS

| | | |
|---|---|---|
| 550,360 | Wurts | Nov. 26, 1895 |
| 871,686 | Freier | Nov. 19, 1907 |
| 946,983 | Panikoff | Jan. 18, 1910 |
| 980,420 | Hulfish | Jan. 3, 1911 |
| 985,193 | McIntyre | Feb. 28, 1911 |
| 1,197,168 | Ziegler | Sept. 5, 1916 |
| 2,086,221 | Gwyn | July 6, 1937 |